US 6,595,568 B1

(12) United States Patent
Schroeder et al.

(10) Patent No.: US 6,595,568 B1
(45) Date of Patent: Jul. 22, 2003

(54) MULTI-PURPOSE LINER FOR VEHICLE COMPARTMENT

(75) Inventors: Del C Schroeder, Bloomfield Hills, MI (US); Jeremy A Panasiewicz, Pontiac, MI (US); Jason E Fulcher, Royal Oak, MI (US); Gerard Olszewski, Temperance, MI (US); Patrick J O'Mahony, West Bloomfield, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/292,018

(22) Filed: Nov. 12, 2002

(51) Int. Cl.$^7$ ............................................... B60R 13/01
(52) U.S. Cl. ..................................... 296/39.1; 296/39.2
(58) Field of Search .............................. 296/39.1, 39.2, 296/214, 222, 37.16, 97.23, 26.09, 159

(56) References Cited

U.S. PATENT DOCUMENTS

| | | | | |
|---|---|---|---|---|
| 2,801,018 A | * | 7/1957 | Yount | 217/3 R |
| 2,898,146 A | * | 8/1959 | Yudenfreund | 296/39.1 |
| 3,937,363 A | * | 2/1976 | Anderson | 222/105 |
| 3,951,284 A | * | 4/1976 | Fell et al. | 222/39.1 |
| 4,141,581 A | * | 2/1979 | Tobin | 296/39.2 |
| 4,461,402 A | * | 7/1984 | Fell et al. | 296/39.1 |
| 4,516,906 A | * | 5/1985 | Krein | 296/39.1 |
| 4,671,733 A | * | 6/1987 | Krein | 296/39.1 |
| 4,673,207 A | * | 6/1987 | Reynolds et al. | 296/39.1 |
| 4,763,820 A | * | 8/1988 | Gardner, Jr. | 224/572 |
| 4,875,731 A | * | 10/1989 | Ruiz | 296/39.2 |
| 4,877,281 A | * | 10/1989 | Altmann | 296/39.1 |
| 4,893,862 A | * | 1/1990 | Hollenbaugh, Sr. | 296/39.1 |
| 4,917,431 A | * | 4/1990 | McDonald | 296/39.1 |
| 5,028,197 A | * | 7/1991 | Krein et al. | 414/467 |
| 5,215,345 A | * | 6/1993 | Orphan | 296/39.1 |
| 5,244,332 A | * | 9/1993 | Krein et al. | 296/39.1 |
| 5,322,335 A | * | 6/1994 | Niemi | 296/39.1 |
| 5,378,034 A | * | 1/1995 | Nelsen | 296/39.2 |
| 5,419,602 A | * | 5/1995 | VanHoose | 296/39.1 |
| 5,511,681 A | * | 4/1996 | Podd | 220/1.6 |
| 5,570,921 A | * | 11/1996 | Brooker | 296/39.1 |
| 5,722,710 A | * | 3/1998 | Falciani | 296/39.1 |
| 5,806,909 A | * | 9/1998 | Wise | 296/39.1 |
| 6,082,800 A | * | 7/2000 | Schambre et al. | 296/26.09 |
| 6,142,550 A | * | 11/2000 | Blyth et al. | 296/39.1 |
| 6,203,089 B1 | | 3/2001 | Doolittle, III et al. | |
| 6,206,443 B1 | * | 3/2001 | Konop et al. | 296/39.1 |
| 6,481,784 B2 | * | 11/2002 | Cargill | 296/159 |
| 6,536,827 B2 | * | 3/2003 | Oswald et al. | 296/39.1 |

* cited by examiner

Primary Examiner—Kiran Patel
(74) Attorney, Agent, or Firm—Thomas A. Jurecko

(57) ABSTRACT

A removable, bag-like protective liner is provided for the interior of a motor vehicle with a rear opening. The liner defines an internal compartment for storage of cargo in the rear of the vehicle while protecting the interior of the vehicle from damage by the cargo. The liner is supported by a plurality of attachments which secure the liner to the interior of the motor vehicle. In addition, a sidewall portion and the forward end portion are configured such that the height of the liner can be selectively adjusted based upon the interior height of the vehicle.

20 Claims, 3 Drawing Sheets

MULTI-PURPOSE LINER FOR VEHICLE COMPARTMENT

FIELD OF THE INVENTION

The present invention relates to protective coverings and more specifically to a multi-purpose liner for a vehicle compartment.

BACKGROUND OF THE INVENTION

The interior of a motor vehicle having a rear hatch or a rear opening, such as a van, minivan, SUV or station wagon, has been designed to allow users to carry a variety of things in the rear portion of the vehicle, similar to the functional purposes of a flat bed truck. In addition to providing a means for transporting objects, the interior of a van, minivan, SUV or station wagon is designed to provide a clean and comfortable environment to the people, pets or objects which are being carried. The ability to carry a variety of things in the rear part of a motor vehicle is one of the key features in designing a motor vehicle with a rear hatch or opening.

In order to maintain a clean environment within a motor vehicle when transporting utility cargo such as lumber, logs, sand, gravel or small shrubs, a temporary liner must be put in place to protect the upholstered environment of the motor vehicle. If utility cargo is placed within the motor vehicle without using some sort of protective covering, the interior of the motor vehicle has the potential of becoming damaged due to dirt or other debris left from the cargo being carried. In addition to potentially damaging the upholstery of the interior of the motor vehicle, any mechanical devices located on the floor of motor vehicle, such as seat floor anchors, could become damaged or nonfunctional due to debris being trapped within these devices.

Protective liner arrangements have been proposed. However, because the rear portion of a vehicle can typically have various configurations, e.g., the rear portion of the vehicle can have variable floor heights depending on whether the seats are folded flat or if the seats are removed, a need exists for a multi-purpose liner that is adjustable based upon the configuration of the vehicle.

SUMMARY OF THE INVENTION

Accordingly, the present invention provides a variable size bag-like protective liner for the interior of a motor vehicle with a rear opening. The liner includes a main body having a floor portion, a sidewall portion and a ceiling portion assembled together to reflect the size and shape of the rear interior cavity of the vehicle. The main body of the liner defines an internal compartment. The liner is supported by a plurality of attachments which secure the liner to the interior of the motor vehicle. In addition, each of the sidewall and the forward end portions are configured such that at least the sidewall portions can be folded upon themselves according to the height of the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description is merely exemplary in nature and is in no way intended to limit the invention, its application, or uses.

The present invention is generally related to a liner for a vehicle compartment. In this regard, the liner will be described in the context of a liner for use in a rear compartment of a minivan having a rear opening with a rear tailgate. However, it is to be understood that the principles embodied herein are equally applicable to other types of vehicles and vehicle compartments.

Figure 1:
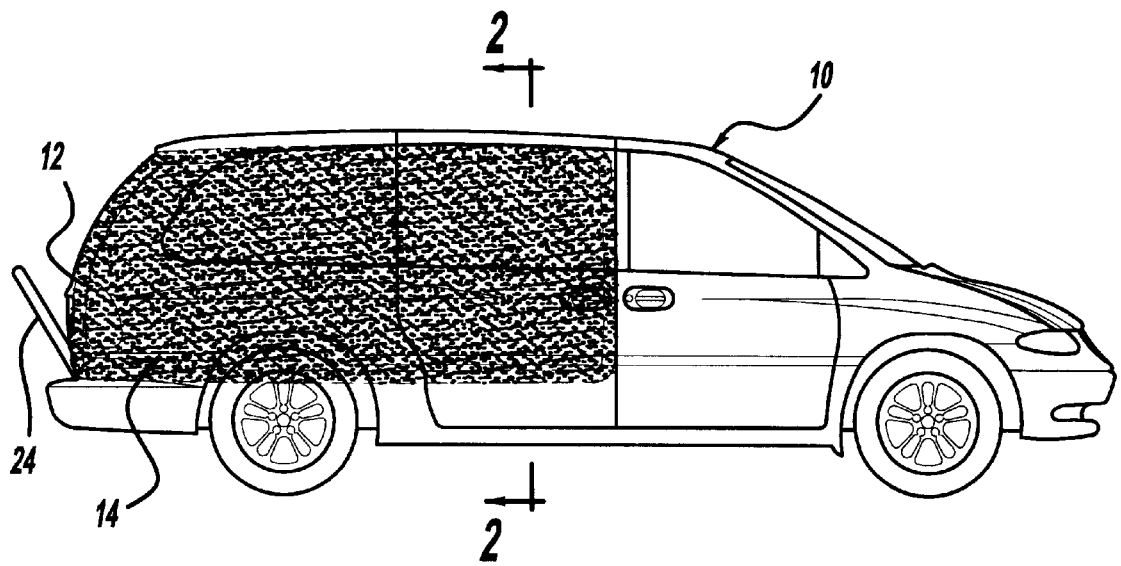
FIG. 1 is a side view of a vehicle having a multi-purpose liner in the vehicle compartment according to the principles of the present invention.
Figure 2:
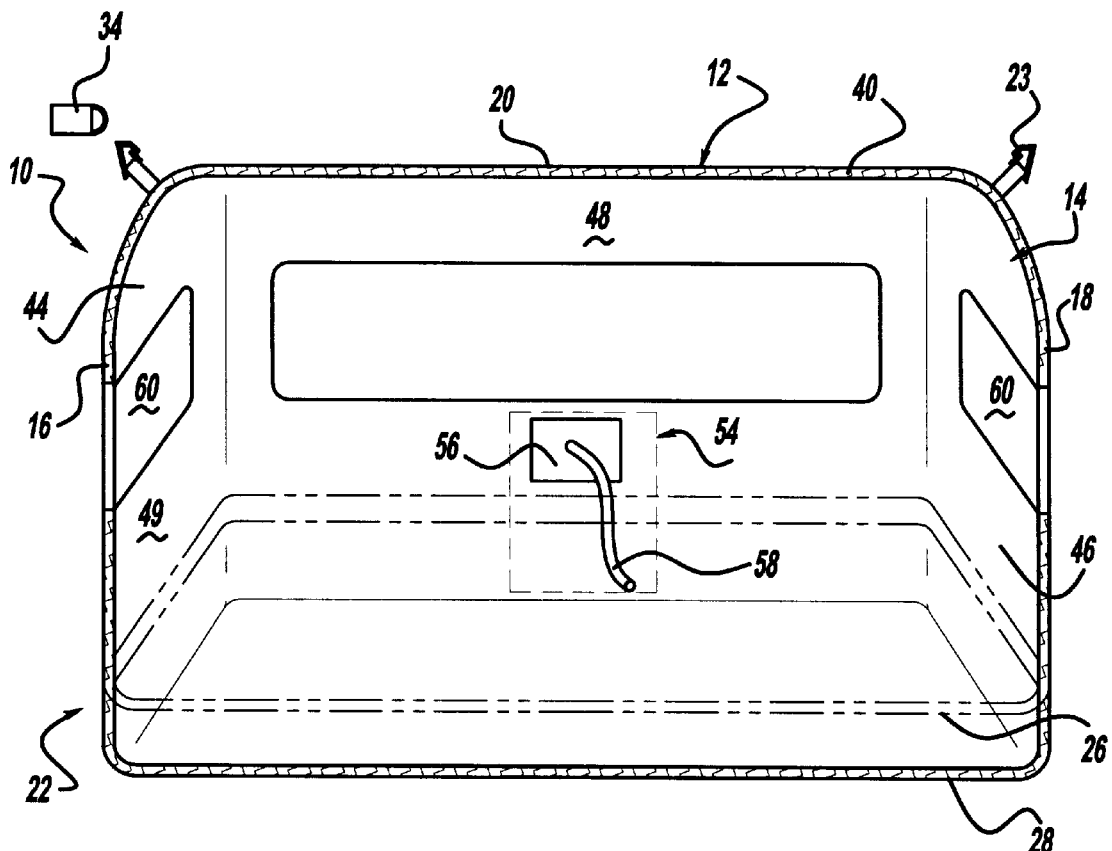
FIG. 2 is a cross section of the vehicle shown in FIG. 1 along line 2—2.

Referring generally to FIGS. 1 and 2, a vehicle 10 is shown having a compartment 12. A multi-purpose liner 14 is disposed within the compartment 12. The compartment 12 includes a first sidewall 16, a second sidewall 18, a top 20, a bottom 22 and a tailgate 24. The compartment 12 is assembled as known in the art.

The bottom 22 of the compartment 12 is determined by the configuration of the vehicle 10. FIG. 2 shows two possible locations for the bottom 22 of the compartment 12. If the vehicle 10 has seats which fold flat, the bottom 22 of the compartment 12 is considered to be at a first level 26. If the vehicle 10 has seats which can be extracted from the compartment 12, then the bottom 22 of the compartment 12 is considered to be at a second level 28.

Figure 3:
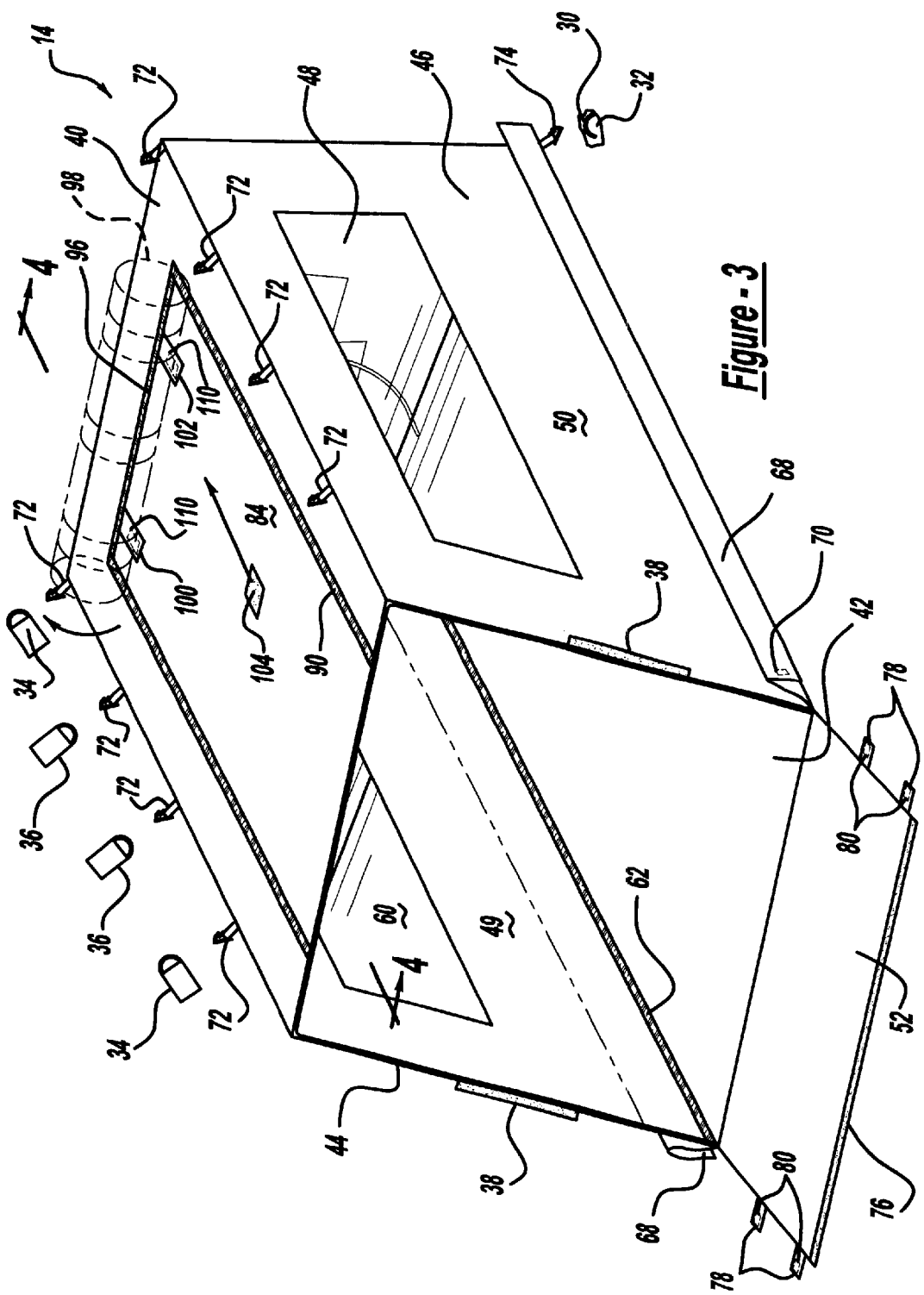
FIG. 3 is a perspective view of a multi-purpose liner for a vehicle compartment according to the principles of the present invention.

Referring now to FIG. 3, the bottom 22 has a pair of floor anchors 30 for securing the liner 14 to the compartment 12. In this embodiment, the floor anchors 30 are eyehooks which attach to a seat belt anchor 32.

The first sidewall 16 and the second sidewall 18 of the compartment 12 suspend the liner 14 in the compartment 12. The first and second sidewalls 16, 18 of the compartment 12 each have a pair of eyehooks 34 and a pair of coat hooks 36. The eyehooks 34 are used in combination with the coat hooks 36 to secure the liner 14 to the first and second sidewalls 16,18. The eyehooks 34 and coat hooks 36 are generally made of plastic and a relocated along the top edge of the first and second sidewalls 16, 18. Further, a plurality of adhesive strips 38 line the rear opening of compartment 12. The adhesive strips 38 can be of any type such as, for example, Velcro™. The adhesive strips 38 also assist in securing the liner 14 to the compartment 12.

The liner 14 is configured to mate with the compartment 12 of the vehicle 10. Specifically, the liner 14 is placed adjacent to the walls 16, 18, 20, 22 of the compartment 12 to maximize the area protected by the liner 14 and hence the amount of protected cargo space in the compartment 12. As shown for illustrative purposes only, the liner 14 can be generally rectangular having a top 40, bottom 42, a side portion formed from a side 44 and 46, and a back 48. The top 40, bottom 42, and sides 44 and 46 define an interior 49 and exterior 50 of the liner 14. In addition, the liner 14 can include a tailgate portion 52 configured to mate with the corresponding tailgate 24 of the compartment 12. The liner 14 can be made from any material that allows the liner 14 to be flexible and durable throughout its use, such as, for example, Dacron™, canvas, a strong plastic film or a combination of both plastic and fabric. In general, the liner 14 is made from one cut sheet of material and sewn into the configuration necessary for the vehicle 10.

With reference to FIG. 2, attached to the back 48 of the liner 14 is a pull system 54. The pull system 54 has at least one patch 56 which is affixed to the back 48. The patch 56 can be attached, for example, through sewing or the use of an adhesive. The patch 56 can be made from any desirable material known in the art such as, for example, Dacron™, canvas or a strong plastic film. A rope 58 is attached to the patch 56 such that the rope 58 extends into the interior of the liner 14. The rope 58 is used to reverse the liner 14 for cleaning outside of the compartment 12.

One or more of the sides 44 and 46, and/or back 48 of the liner 14 can be provided with a window 60. The window 60 can be of the plastic type used in convertible top applications. The windows 60 are sewn into the liner 14. The window 60 is generally clear for increased visibility. The location of the window 60 corresponds to the location of the windows in the compartment 12 of the vehicle 10.

Figure 4:
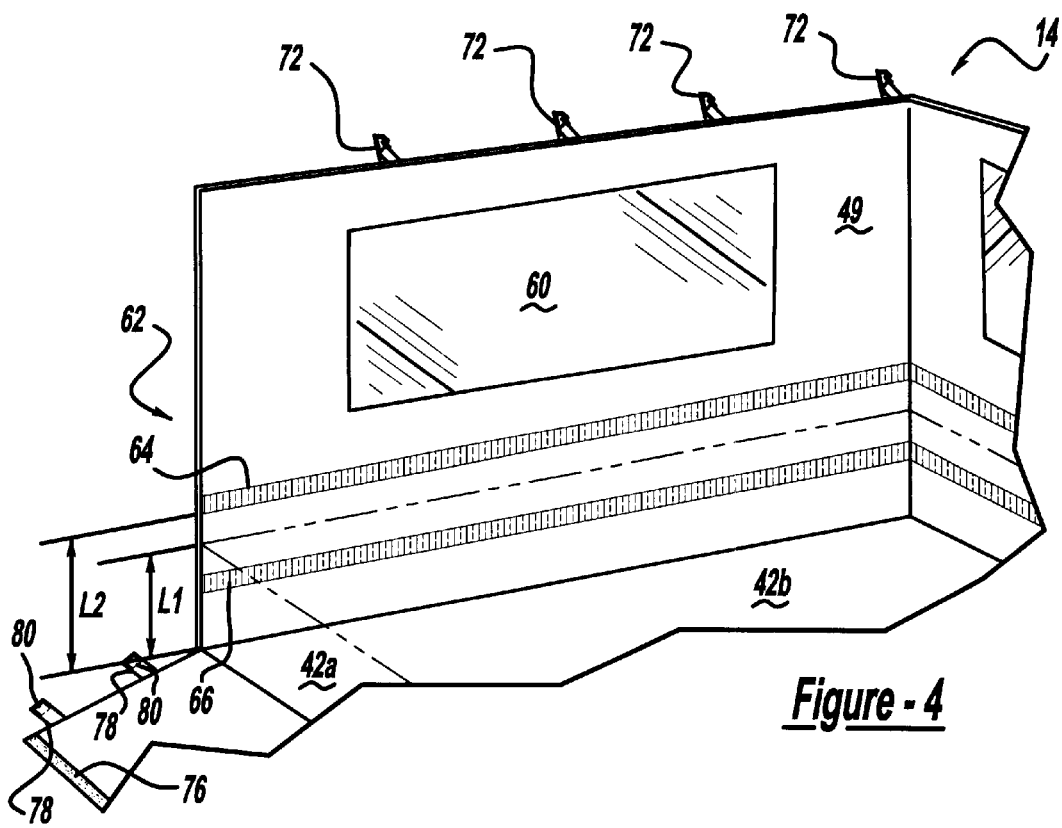
FIG. 4 is a cross sectional view along line 4—4 of the liner of FIG. 3.

Referring now to FIG. 4, each of sides 44 and 46, and back 48 of the liner 14 also include a first fastener system 62 located on the interior 49 of the liner 14. The first fastener system 62 is any system capable of enabling the liner 14 to fold over onto itself to form a liner 14 with an adjustable height. The first fastener system 62 can include, for example, adhesive strips, snaps, buttons, zippers or the like. In the liner 14 shown in FIG. 4, the first fastener system 62 is a zipper having mating teeth positioned at 64 and 66. The first fastener system 62 enables the liner 14 to be raised or lowered depending upon the level of the bottom 22 of the compartment 12 of the vehicle 10. In particular, when the first fastener system 62 is disengaged, the liner 14 has a bottom 42a at a level L2 which corresponds with the second level 28 of the bottom 22 of the compartment 12 as shown in FIG. 2. If the first fastener system 62 is engaged, the liner 14 has a bottom 42b with a level L1 corresponding to the first level 26 of the bottom 22 of the compartment 12. With the first fastener system 62 engaged, the first and second sidewalls 44, 46 have a section of excess material 68 as shown in FIG. 3. The excess material 68 is secured to the liner 14 by an adhesive strip 70 and folded between the compartment 12 and the liner 14 as shown in FIG. 3. The capability to vary the height of the liner 14 enables the owner to use the liner 14 in multiple configurations of the compartment 12.

With reference now to FIG. 4, the liner 14 is suspended in the compartment 12 of the vehicle 10 by a plurality of hooks 72 which attach to the eyehooks 34 and coat hooks 36 on the first and second sides 16, 18 of the compartment 12. In the example of FIG. 4, there are four hooks 72 located on the exterior 50 of the liner 14 along the mating edge between side 44 and top 40. The attachment points on the liner 14 for the hooks 72 are reinforced with fabric. Four hooks 72 are also located on the exterior 50 of the liner 14 along the mating edge between side 46 and top 40. The liner 14 is secured to the bottom 22 of the compartment 12 by two bottom hooks 74. The bottom hooks 74 are attached to an elastic rope (not shown) secured in the liner 14 at the mating edge between the bottom 42 and the back 48. The elastic rope is secured to the liner 14, for example, by sewing. By having the bottom hooks 74 attached to the elastic rope, the bottom 42 of the liner 14 is held taut which maintains the general shape of the liner 14. The bottom hooks 74 attach to the floor anchors 30 in the compartment 12. The hooks 72 and bottom hooks 74 may be of any type of releasable clamps.

The tailgate portion 52 of the liner 14 is generally rectangular, however, the tailgate portion 52 is configured to mate with the corresponding tailgate 24 of the compartment 12. A fastener strip 76 is located along the edge of the tailgate portion 52. In this embodiment, the fastener strip 76 is made from Velcro™, however, other devices such as snaps or buttons may be used. The tailgate portion 52 also has a plurality of tabs 78 extending therefrom which are lined with a fastening mechanism 80. The fastening mechanism 80 may include Velcro™, snaps or the like. The tabs 78, along with the fastening strip 76, are used to secure the liner 14 to the tailgate 24.

Figure 5:
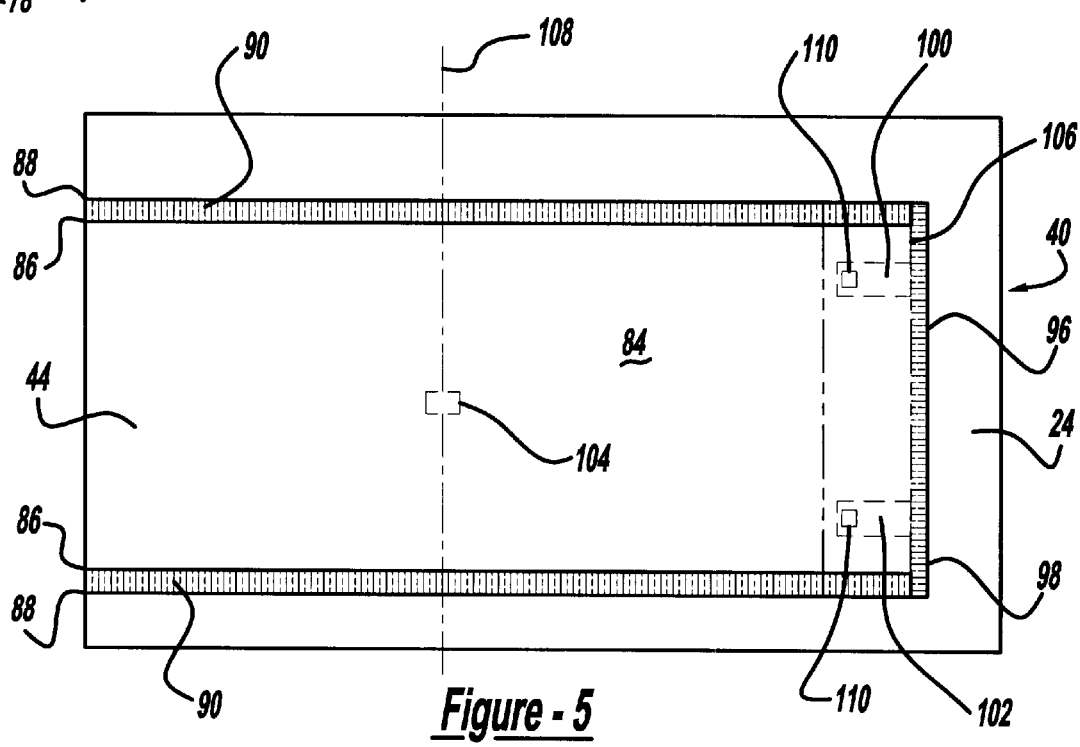
FIG. 5 is a top view of the multi-purpose liner of FIG. 3.

Referring to FIG. 5, the top 40 of the liner 14 is shown. In this embodiment, the top 40 has a tongue-like section 84 having a pair of edges 86. The top 40 could, however, be continuous throughout. The top 40 also has a pair of mating portions 88 which mate with the pair of edges 86. The edges 86 and mating portions 88 are lined with a fastener system 90. The fastener system 90 enables the tongue-like section 84 to be stored in a rolled up position (shown in phantom). The fastener system 90 may include, for example, adhesive strips, snaps, buttons, zippers or the like. The fastener system 90 also retains the section 84 in an unrolled position. The fastener system 90 for the top 40 of the liner 14 can be identical to the fastener system 62 for sides 44, 46 and back 48 of the liner 14, depending upon the vehicle 10. In this application, the fastener system 90 is a zipper having mating teeth along the edges 86 and mating portions 88. When the teeth of the zipper are engaged, the top 40 is flat. When the teeth of the zipper disengage, the tongue-like section 84 is free to roll up to provide easier access to the compartment 12. The tongue-like section 84 has a second fastener system 92 to secure the tongue-like section 84 in a rolled state.

The second fastener system 92 includes a first strip 96, a second strip 98, a first strap 100, a second strap. 102 and a third strap. 104. The first and second straps 100, 102 are located in the exterior 50 of the liner 14 and are attached at a back edge 106 of the tongue-like section 84. The third strap 104 is located on the interior 49 of the liner 14 and is attached at a center 108 of the tongue-like section 84. The first, second and third straps 100, 102, 104 have fastening mechanism 110 as shown. The first, second and third straps 100, 102, 104 are designed to mate with the first and second strips 96, 98 to retain the. tongue-like section 84 in a rolled state. The first strip 96 is positioned on the exterior 50 of the liner 14, along the back edge 106. The second strip 98 is located on the interior 49 of the liner 14, along the back edge 106. The first and second strips 96, 98 are comprised of a fastening mechanism configured to mate with the fastening mechanisms 110 of the first, second and third straps 100, 102, 104. The fastening mechanisms 110 on both the straps 100, 102, 104 and the strips 96, 98 may include, for example, adhesive strips, snaps, buttons, zippers or the like. When the tongue-like section 84 is rolled up, the first and second straps 102 wrap around the rolled up section and fasten to the second strip 98, while the third strap 104 wraps around the rolled up section and fastens to the first strip 96.

To detach the liner 14 from the vehicle 10, the liner 14 is first released from the second fastener system 96. Then, the liner 14 is released from the fastener strip 76 and the tabs 78. Next, the hooks 72 and the bottom hooks 74 are unclasped from the compartment 12. The liner 14, once detached from the vehicle 10, can be folded and rolled into an elongated cylinder. The liner 14 can be placed into a drawstring bag (not shown). The liner 14 is set-up in the compartment 12 by following the reverse of the above described steps.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A removable protective liner for the interior of a motor vehicle having a rear opening, the liner comprising:
   a main body including a floor portion arranged to cover at least a portion of the vehicle interior floor, a wall portion attached to the floor portion and arranged to cover at least a portion of the vehicle interior sidewalls, a ceiling portion attached to the wall portion, and a forward end portion attached to each of the ceiling portion, the wall portion and the floor portion, such that the main body reflects the size and shape of the rear interior cavity of the vehicle; and
   a plurality of attachments mounted to the main body adapted for securing the main body within the interior of the motor vehicle;
   wherein the wall portion and the forward end portion each include a fastening element arranged to allow one or both of the wall or forward end portions to be folded upon themselves according to an interior height of the vehicle.

2. The liner of claim 1 wherein the main body is made from a sheet material including at least one of fabric, Dacron™ and plastic.

3. The liner of claim 1 wherein the main body has an open end, opposite the forward end portion and providing access to an internal compartment defined by the main body.

4. The liner of claim 1 wherein the ceiling portion has a tongue-shaped section which is configured to enable the tongue-shaped section to be rolled up.

5. The liner of claim 4 wherein the tongue-shaped portion includes a release mechanism located along a boundary between the tongue-shaped portion and the ceiling portion.

6. The liner of claim 5 wherein the release mechanism is selected from at least one of a zipper, Velcro™, buttons and snaps.

7. The liner of claim 1 wherein the ceiling portion includes at least one strap configured to secure the ceiling portion to the interior of the vehicle.

8. The liner of claim 4 wherein the tongue-shaped section includes at least one strap with a fastening mechanism to secure the tongue-shaped section in a rolled state.

9. The liner of claim 1 wherein the wall portion of the main body includes a substantially transparent window therein.

10. The liner of claim 1 wherein the forward end portion includes at least one strap coupled to a first side for reversing the liner to remove debris outside the interior of the vehicle.

11. The liner of claim 1 wherein the floor portion includes a tailgate section configured to mate with a tailgate of the vehicle.

12. The liner of claim 11 wherein the tailgate portion includes at least one mechanism to fasten the tailgate portion to the tailgate of the vehicle.

13. The liner of claim 1 wherein the fastening system is selected from at least one of a zipper, buttons, Velcro™ or snaps.

14. The liner of claim 1 wherein the plurality of attachments for securing the main body includes a first releasable clamp located on an end of an elastic rope and a second releasable clamp located on an opposite end of the elastic rope for retaining the liner to a bottom of the rear opening in the interior of the motor vehicle.

15. The liner of claim 14 wherein the elastic rope is coupled to the floor portion and the front end portion through at least one of sewing and an adhesive.

16. The liner of claim 1 wherein the plurality of attachments for securing the main body includes a plurality of releasable clamps attached to a seam of the wall and ceiling portions.

17. The liner of claim 16 wherein the seam of the wall and ceiling portion is reinforced with a fabric.

18. A removable protective liner for the interior of a motor vehicle having a rear opening, the liner comprising:
   a main body formed from sheet material and including a floor portion, a wall portion attached to the floor portion, a ceiling portion having a tongue-shaped opening configured to be rolled up attached to the wall portion, and a forward end portion attached to each of the ceiling portion, the wall portion and the floor portion such that the main body reflects the size and shape of the rear interior cavity of the vehicle;
   a rope attached to a forward end wall portion of the main body;
   a plurality of attachments mounted to the main body adapted for securing the main body within the interior of the motor vehicle; and
   wherein the wall portion and the forward end portion include a fastening element which enables the wall portions to be folded upon themselves according to the height of the vehicle.

19. The liner of claim 18 wherein the sheet material is made from at least one of fabric, Dacron™ or plastic.

20. The liner of claim 19 wherein the main body has an open end, the open end provides access to an internal compartment defined by the main body.

* * * * *